Figure 1:
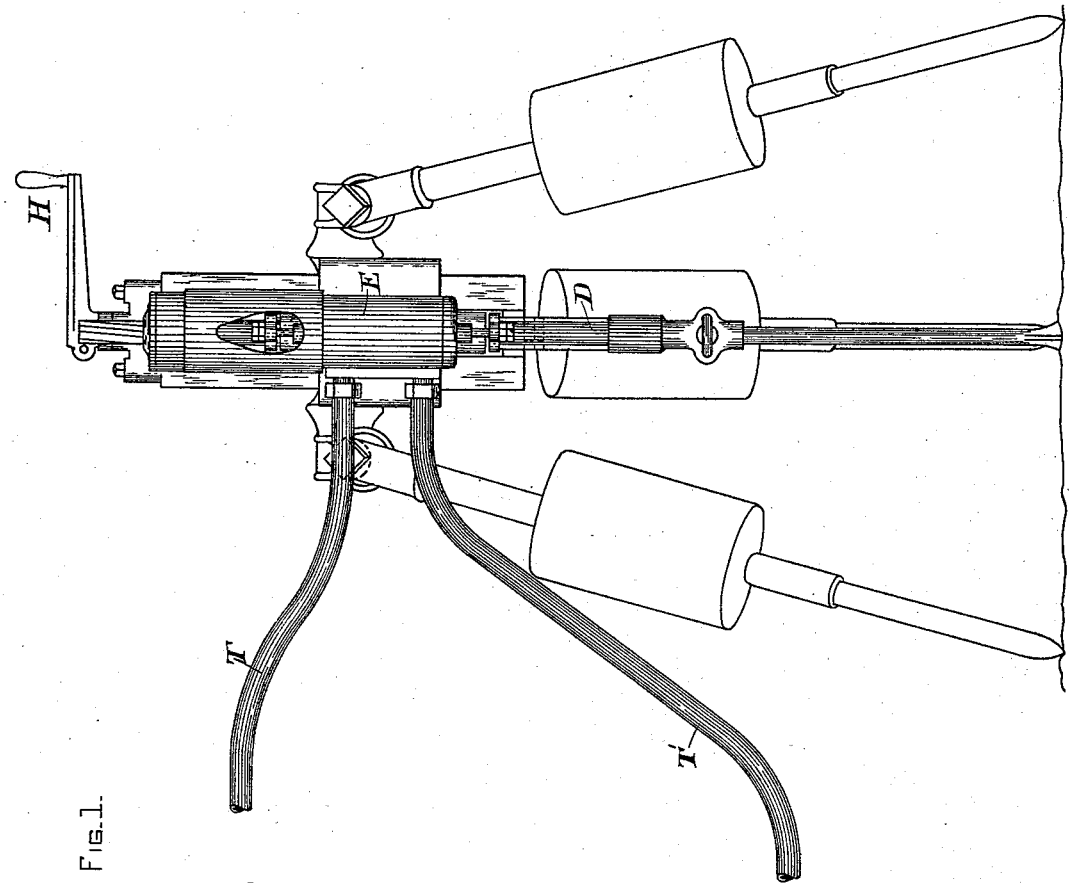
Figure 1:
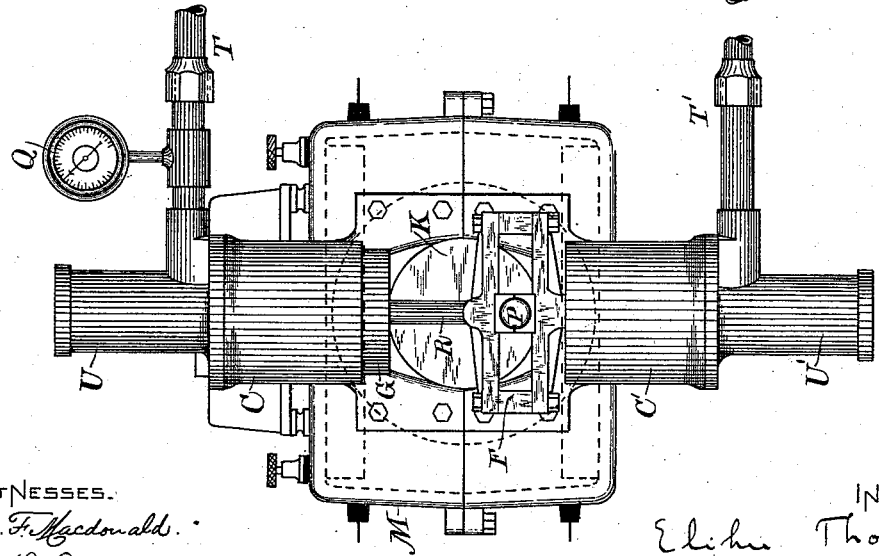

(No Model.)  2 Sheets—Sheet 1.

E. THOMSON.
MEANS FOR OPERATING DRILLS.

No. 534,730. Patented Feb. 26, 1895.

Witnesses.
A. F. Macdonald
A. L. Orne

Inventor
Elihu Thomson
By Bentley + Blodgett
Attys.

(No Model.) 2 Sheets—Sheet 2.
E. THOMSON.
MEANS FOR OPERATING DRILLS.
No. 534,730. Patented Feb. 26, 1895.
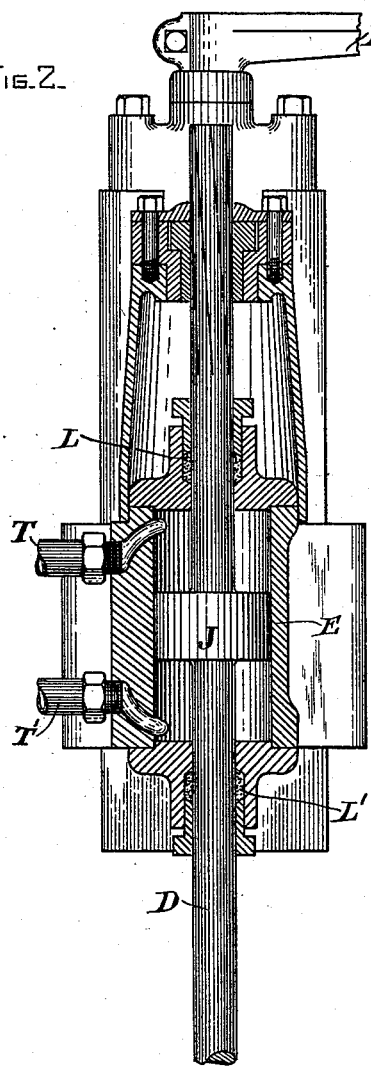
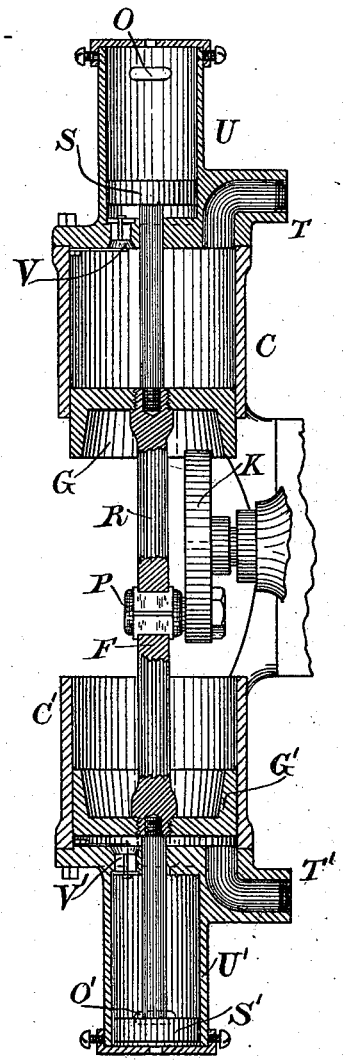

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

MEANS FOR OPERATING DRILLS.

SPECIFICATION forming part of Letters Patent No. 534,730, dated February 26, 1895.

Application filed March 17, 1892. Serial No. 425,238. (No model.)

*To all whom it may concern:*

Be it known that I, ELIHU THOMSON, a citizen of the United States, residing at Swampscott, in the county of Essex and State of Massachusetts, have invented certain new and useful Improvements in Means for Operating Drills, of which the following is a specification.

My present invention relates to improvements in means for operating drills or other mechanism of a reciprocating character used in mining operations. For many years compressed air has been more or less used for this purpose, but compressed air installations are highly inefficient, owing to the great loss of power in transmission. There are many other troubles incident to such plants, such as the intense heat generated by the compressor, and the corresponding reduction of temperature when the compressed air is allowed to expand, the severe changes in temperature causing much annoyance in handling the machinery. Since the introduction of electric power plants, much study has been given to the utilization of electricity for operating mining machinery. It was soon found that although the power could be generated at some convenient waterfall or otherwise, and could be conveyed for long distances without much loss of energy, yet in translating it into motion by means of electric drills and the like, a serious loss was met with, and more or less difficulty and danger encountered in handling the apparatus. The loss in efficiency was largely due to the fact that in an electric reciprocating drill the speed of cutting the lines of force is limited to the speed of the reciprocating part of the machine. Furthermore, the construction of these machines is such as to involve magnetic circuits of large magnetic resistance; while economy of translation by dynamo electric machinery requires a low magnetic resistance and a high speed cutting of the lines of force. It thus appeared that in both forms of power transmission, that by compressed air and that by electricity, considerable losses occurred, so that neither solution of the problem was entirely satisfactory. It occurred to me that by combining the good points of both systems, I would be able to discard those features of both which were objectionable.

My invention therefore has for its object to provide a means for operating mining machinery by power transmitted from a central station outside the mine through electric conductors to an electric motor of any suitable type, in which the speed of cutting of the lines of force is comparatively high, and which therefore works with high efficiency. This motor is connected with an air pump, connected by tubing with a cylinder in which works a piston whose piston rod carries the drill.

The pump which I prefer to use is a double cylinder pump, arranged to act reversely, that is, one compresses while the other exhausts, and thereby there is produced simultaneously, condensation on one side of the drill piston and rarefaction on the other side, which of course alternates at every stroke of the pump. The drill which I prefer has a piston working in a cylinder, the ends of which are connected respectively with the two pump cylinders. The air is thus simply forced back and forth from the pumps to the drill cylinder, and by these alterations of pressure the drill piston is reciprocated.

In the accompanying drawings, Figure 1 illustrates in diagram and perspective a drill and the means for operating it herein proposed. Fig. 2 is a sectional view through the drill cylinder and piston, and Fig. 3 is a sectional view through the air compressing pumps.

In Fig. 1, M is a box containing an electric motor of the ordinary rotary pattern, upon the power shaft of which is a crank disk K, provided with a crank pin P. If desired the motor may be connected to the power shaft through gearing, though the direct connection is preferred. As the disk K revolves it reciprocates the frame F, from each side of which extends a rod R carrying a plunger, which plungers enter cylinders C, C', located opposite one another, and are reciprocated therein while the motor is running. These cylinders being filled, as they are, with a fluid, preferably air, alternate rarefaction and condensation will be produced on movement of the plungers. Openings are provided at the heads of the cylinders connected with tubes T, T', and allow entrance into and expulsion of the air or other fluid from the cylinders at each stroke of the plungers. A gage Q shows the pressure maintained. The pipes T, T', which are made capable of withstanding considerable pressure, are connected respectively with the ends of a cylinder E, in which works a driven piston which moves in synchronism with the plungers in the pump cylinders. As shown in Fig. 1, these reciprocations are utilized for operating the drill D. The drill resembles somewhat a compressed air drill but has no valves, and instead of a constant supply of air and exhaust there is no escaping air, but merely an alternating pressure at the two ends of the cylinder. It is provided with the usual mechanism for rotating the drill and with a feeding device, as for example, handle H, by which the entire drill may be raised and lowered, the tubes T and T' being flexible or jointed to allow any desired change of position of the drill without interfering with the working of the power transmitter.

Figs. 2 and 3 show more in detail the construction of the pumps and drill operating mechanism. Here G, G' are the pump plungers working tightly in cylinders C, C' which are open at one end, and at the other lead respectively to pipes T, T'. At the closed ends of the cylinders are two small cylinders U, U' in which work accessory plungers S, S'. As these latter plungers reciprocate, air is taken into the smaller cylinders through openings O, O', and is forced through the valves V, V' into the larger cylinders. The smaller cylinders and pistons therefore form compressing pumps, continually pumping air into the larger cylinders, the purpose being to increase the air pressure within the main cylinders, and to supply any possible leaks around the plungers or through the packing of the drill mechanism. By these means, an actual gage pressure may be preserved in the pipes T, T' of say sixty pounds to the square inch, rising to one hundred pounds on the movement of the plunger into the cylinder, and falling to twenty pounds on the movement of the plunger outwardly.

Referring to the drill mechanism, J is a piston upon the drill shaft, which moves back and forth in the cylinder E carried on a supporting frame above the drill. Suitable ports are provided connecting the opposite ends of the cylinder with the pipes T, T' respectively, and thereby with the pumps C, C'. Suitable packing boxes around the drill piston rod D, are provided at L, L', for preventing escape or entrance of air. A small clearance is left at each end of the cylinder beyond the ports, and cushions any upward or downward blow which might otherwise cause the piston J to strike the heads of cylinder E. The capacity of the cylinders C, C', should of course be larger than the space on each side of the piston J, and this disproportion of size should increase with the length of the connecting tubes T, T', in order that the alternations of pressure on the two sides of pistons J may be effectively transmitted from the pumps, notwithstanding the dead spaces in the tubes.

What I claim as new, and desire to secure by Letters Patent, is—

1. A system of power distribution, comprising a power station, electric conductors conveying energy from the station to an electric motor at a distant point, a fluid compressor driven by said motor, said compressor provided with auxiliary cylinders arranged to maintain a high pressure therein, and a reciprocating mining machine located near such compressor and adapted to be driven by the alternations of fluid pressure therein, substantially as described.

2. In combination, a fluid compressor having auxiliary cylinders connected by a valve with the main cylinders and arranged to maintain a high pressure therein and so compensate for leakage, a reciprocating drill or similar mechanism, and pipes connecting the fluid compressor with the cylinder of the drill; whereby the alternations of pressure maintained at a high point, may be caused to actuate the drill, substantially as herein set out and described.

In witness whereof I have hereunto set my hand this 14th day of March, 1892.

ELIHU THOMSON.

Witnesses:
JOHN W. GIBBONEY,
BENJAMIN B. HULL.